US009286526B1

(12) United States Patent
Manohar

(10) Patent No.: US 9,286,526 B1
(45) Date of Patent: Mar. 15, 2016

(54) COHORT-BASED LEARNING FROM USER EDITS

(71) Applicant: Amazon Technologies, Inc., Reno, NV (US)

(72) Inventor: Vasant Manohar, Tamil Nadu (IN)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 14/100,819

(22) Filed: Dec. 9, 2013

(51) Int. Cl.
*G06K 9/03* (2006.01)
*G06K 9/00* (2006.01)

(52) U.S. Cl.
CPC .................................. *G06K 9/00852* (2013.01)

(58) Field of Classification Search
CPC ....... G06K 2209/01; G06K 9/00; G06K 9/80; G06K 9/00442; G06K 9/2063; G06K 9/228; G06K 9/344; G06K 9/00463; G06K 9/00979; G06K 9/033; G06K 9/2081; G06K 9/6857; G06K 9/723; G06K 9/004049; G06K 9/00456; G06K 9/00469; G06K 9/00476; G06K 9/00483; G06K 2209/011; G06K 2209/013; G06K 2209/00489
USPC ......... 382/181, 182, 173, 176, 177, 180, 309, 382/311, 187
See application file for complete search history.

(56) References Cited

U.S. PATENT DOCUMENTS

| | | | | |
|---|---|---|---|---|
| 5,048,097 A | * | 9/1991 | Gaborski et al. | 382/156 |
| 5,459,739 A | * | 10/1995 | Handley et al. | 714/797 |
| 7,221,800 B2 | * | 5/2007 | Sesek et al. | 382/229 |
| 7,305,129 B2 | * | 12/2007 | Chellapilla et al. | 382/174 |
| 7,764,830 B1 | * | 7/2010 | Wnek | 382/159 |
| 8,515,751 B2 | * | 8/2013 | Zanolin et al. | 704/235 |
| 8,787,670 B2 | * | 7/2014 | Cowley et al. | 382/176 |
| 2002/0156816 A1 | * | 10/2002 | Kantrowitz et al. | 707/530 |
| 2013/0077856 A1 | * | 3/2013 | Ferro | 382/159 |

* cited by examiner

*Primary Examiner* — Sheela C Chawan
(74) *Attorney, Agent, or Firm* — Lee & Hayes, PLLC

(57) ABSTRACT

A platform for generating a first character recognition-based work including a first plurality of automatically-made edits, each edit being characterized by a Unicode and a confidence score. The platform may identify at least one edit as being of questionable accuracy based on the confidence score, may determine a unique character signature of the edit, and may receive a manual correction made to the edit. The platform may also store the manual correction in association with the character signature and the Unicode, such that the manual correction is configured for use in generating a second plurality of automatically-made edits in a second character recognition-based work different than the first work.

20 Claims, 5 Drawing Sheets

COHORT-BASED LEARNING FROM USER EDITS

BACKGROUND

The continued proliferation of digital content items has led to an increase in the availability of such content items, as well as an increase in the availability of electronic devices and applications used for consuming these content items. For instance, users read text-based content items, such as electronic books (eBooks), magazines, newspapers, documents, or other textual content on an assortment of electronic devices. Many of these text-based content items were originally created as physical printed items. Thus, to make these printed items available as digital content items, the text may be scanned or otherwise imaged, and then the text may be recognized using automated text recognition technology, such as optical character recognition. However, automated text recognition techniques may be susceptible to errors. These errors can require significant manual corrections before the content item can be finalized for consumer use.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
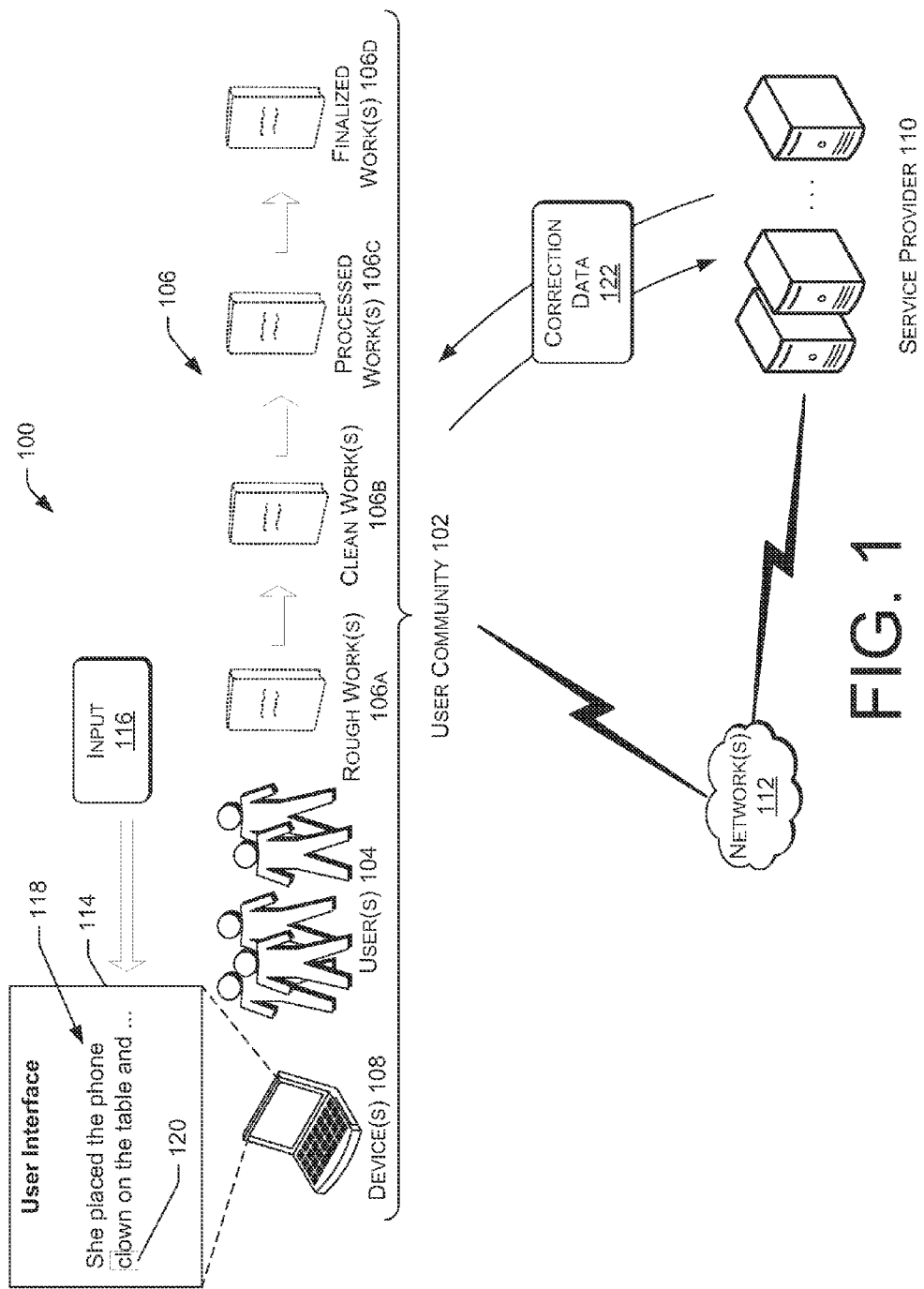
FIG. 1 illustrates an example architecture that may implement a platform for assisting users in generating finalized works.

This disclosure describes, in part, a platform for assisting users in generating finalized works based on previous works generated using automated text recognition technology, such as optical character recognition. This platform includes applications that receive input from a variety of different sources including printed items, digital items, and the like. For example, text, charts, graphs, figures, and/or other content may be scanned or otherwise imaged, and a resulting digital file may be utilized as an input to one or more applications of the present disclosure. Additionally, existing tif, gif, pdf, doc, and/or other like electronic files may also be utilized as inputs to such applications. An exemplary application may combine such inputs into a single rough work. However, the rough work may contain multiple errors. For example, while such a rough work may include content from the inputs, such content may be improperly located on an example page of the work, may have poor image quality, may be improperly formatted or aligned, and/or made be otherwise unacceptable for processing by known automated text recognition technologies.

As a result, a user may utilize the application to revise the rough work by performing one or more manual corrections thereto. Such corrections may include, for example, aligning text, figures, charts, and/or other graphics contained in the rough work, organizing the text into appropriate paragraphs, enhancing the quality of one or more images contained in the rough work, and the like. Such manual corrections by the user may result in a relatively clean work suitable for processing by the automated text recognition technology employed by the application.

For example, one or more of the platforms described herein may include a recognition module configured to process such clean works. As part of such processing, the recognition module may analyze the clean work using text recognition technology. The recognition module may output and/or otherwise generate a first character recognition-based work including edits made automatically by the recognition module. As will be described with respect to the various embodiments discussed below, such automatically-made "edits" may comprise letters, numbers, symbols, and/or other characters that are automatically and/or semi-automatically changed by the recognition modules and/or other modules described herein. For each automatically-made edit, the recognition module may also output respective information characterizing the edit such that the edit may be categorized and/or easily accessed for use by the modules described herein in a further editing process. For example, the recognition module may output, for each automatically-made edit, a respective Unicode corresponding to the character changed by the recognition module, a metric indicative of the bounds of the changed character relative to, for example, a text image of the work, a confidence score associated with the edit, and/or one or more alternate suggested edits associated with the automatically-made edit. Further, the recognition module may also output a respective confidence score corresponding to each alternate suggested edit.

One or more of the platforms described herein may also include a processing module configured to post-process one or more outputs of the recognition module, and to thereby generate a processed work. For example, upon receiving the character recognition-based work and/or other outputs from the recognition module, the processing module may identify at least one of the automatically-made edits as being of questionable accuracy. For example, the processing module may compare the confidence score of each respective automatically-made edit to a confidence score threshold. In such an embodiment, the processing module may characterize automatically-made edits having a confidence score less than the confidence score threshold as being of questionable accuracy, and may characterize automatically-made edits having a confidence score greater than the confidence score threshold as being of acceptable accuracy.

Additionally, upon receiving outputs from the recognition module, the processing module may extract and/or otherwise determine a unique character signature indicative of and/or otherwise associated with an edit automatically-made by the recognition module. Such character signatures may include, for example, a shape identifier, a boundary identifier, a location identifier, and/or other like identifiers indicative of a character of the automatically-made edit. For example, shape context features, and/or other like features known in the art configured to uniquely identify one or more contours of the various characters associated with the automatically-made edit may be extracted by the processing module during generation of the processed work. The various outputs of the recognition module and of the processing module may be stored in one or more data stores, such as within a works data store associated with a local computing device, for future use.

One or more of the platforms described herein may also include a manual correction module configured to receive manual corrections made to the various automatically-made edits described above. For example, the manual correction module may receive manual corrections made by a user viewing one or more of the works stored in the works data store. The manual correction module may also be configured to direct the various manual corrections made by the user to a local correction data store of the computing device for storage. In particular, the manual correction module may direct each manual correction to the local correction data store for storage in association with the character signature, the Unicode, the confidence score, and/or other outputs of the processing module and/or the recognition module associated with the respective corresponding automatically-made edit. As a result, such manual corrections and/or other data associated with the edits automatically-made by the recognition module may be available and/or otherwise configured for use in generating additional automatically-made edits in future works. For example, the manual corrections and/or other data stored in the local correction data store may be utilized by the recognition module during analysis of additional clean works and, thus, in generating additional processed works based thereon. Such works may be different than prior works analyzed by the recognition module, however, such works may contain erroneous automatically-made edits similar to those manually corrected by the user. As a result, utilizing data accumulated in the local correction data store may reduce the manual corrections required in future projects.

Additionally, example platforms described herein may utilize locally-collected correction data to update and/or otherwise modify global correction data for use by multiple computing devices in executing similar character recognition-based applications. For example, one or more of the platforms described herein may include a service provider in communication with and/or otherwise operably connected to the various local computing devices. Such service providers may include tools and/or components similar to those described above with respect to the computing devices. For example, the service provider may include a learning module and a global correction data store. The global correction data store may be configured to store a set of data, such as a set of global correction data that is made available to each of the computer devices via one or more networks. For example, the set of data stored in the global correction store may be provided for local use on each of the computing devices, and may be at least temporarily stored in, for example, the local correction data stores of the respective computing devices described above. During use, the recognition module and/or the processing module may access the set of data stored in the local correction data store for use in making automatic edits to the various works processed thereby. Accordingly, the applications described herein may be used locally when a connection with the service provider, such as a network connection is unavailable.

In an example application, the learning module may be configured to receive correction data, such as the Unicodes, manual corrections, character signatures, confidence scores, and/or alternate suggested edits from each of the remote computing devices. The service provider may be configured to store, for example, a manual correction in association with at least one of a corresponding character signature, Unicode, confidence score, and/or alternate suggested edit in the global correction data store. Such correction data stored in the global correction data store may then be provided to additional users, via the service provider, for use in generating automatically-made edits in additional character recognition-based works.

It is understood that the various manual corrections and other correction data received by the learning module may be stored with an existing set of correction data in the global correction data store. In an example application, the learning module may be configured to update and/or otherwise modify the stored set of correction data based on, for example, the manual corrections and/or other correction data received from the computing devices. For example, upon receiving such correction data, the learning module may evaluate the received correction data in view of corresponding confidence scores generated by the recognition module of the corresponding computing device. Such an evaluation may also take into account the correction history and/or accuracy of the particular user making such manual edits.

For example, the learning module may be configured to determine that a first user provided a first manual correction to a corresponding first automatically-made edit having a confidence score generated by the recognition module below a confidence score threshold. The learning module may also determine that the same user accepted a second automatically-made edit having a confidence score above the confidence score threshold, without providing a manual correction. In such a scenario, the learning module may be configured to assign a first weight to the first user and/or to various manual corrections provided by the first user, and this first weight may be greater than, for example, a second weight assigned to a second user and/or to manual corrections provided by the second user. In particular, the first weight assigned to the first user may be greater than the second weight assigned to the second user in situations in which such a second user has a history of providing manual edits believed to be in accurate. Such exemplary situations may include those in which the second user provides a manual correction to an automatically-made edit having a confidence score above the confidence threshold, and/or accepts an automatically-made edit having a corresponding confidence score below the confidence threshold, without providing a manual correction thereto. In such situations, the learning module may be configured to prioritize inputs received from users having a history of making accurate manual corrections, and may devalue inputs received from other users having a history of making inaccurate manual corrections. These determinations may be made by the learning module based on, for example, confidence scores and/or other output generated by the recognition module and/or the processing module. It is understood that the above examples are merely illustrative. For instance, a user's acceptance of an automatically-made edit having a corresponding confidence score below the confidence threshold, without providing a manual correction thereto, may not necessarily qualify as "inaccurate" in all situations.

In an additional example, the service provider may also include a redundancy module configured to evaluate correction data received from the one or more computing devices. For example, the redundancy module may provide an additional check in the process of updating and/or otherwise modifying the set of data stored in the global correction data store. In particular, upon receiving the character signature and/or the Unicode associated with such correction data, the redundancy module may search the global correction data store to determine whether, for example, a corresponding or matching character signature and/or Unicode is already stored therein. If such a matching character signature and/or Unicode is not already stored within the global correction data store, the redundancy module may direct the newly received correction data to the global correction data store for storage. If, however, such a matching character signature and/or Unicode is already stored within the global correction data store, the redundancy module may increase and/or otherwise modify the confidence score associated with the correction data. For example, the redundancy module may modify such a confidence score utilized by one or more algorithms employed by the learning module in updating and/or modifying the set of data stored in the global correction data store. Alternatively and/or in addition, the redundancy module may direct the recognition modules of the various computing devices to make a corresponding confidence score modification.

In this way, the various applications, platforms, and/or embodiments described herein may assist in minimizing the amount of manual correction required by users in generating finalized works. In particular, platforms of the present disclosure may draw from manual corrections made by a plurality of users using a plurality of respective computing devices to revise a range of different works. Example platforms may learn from such manual corrections to improve the fidelity of automatically-made edits in character recognition-based works over time. Moreover, platforms of the present disclosure may improve the fidelity of such automatically-made edits by post-processing the output of known character recognition engines or other like technologies without modifying the operation of such engines. Further, it is understood that the set of global correction data stored in, for example, the global data store may be formatted and/or otherwise configured for future use by additional (i.e., updated or newer) recognition module versions employed by the various computing devices over time.

While the discussion both above and below highlights a few example tools, applications, platforms, and the like, it is to be appreciated that platforms of the present disclosure may include a multitude of other tools that similarly provide value to users, authors, consumers, and others.

This brief introduction is provided for the reader's convenience and is not intended to limit the scope of the claims, nor the proceeding sections. Furthermore, the techniques described in detail below may be implemented in a number of ways and in a number of contexts. Some example implementations and contexts are provided with reference to the following figures, as described below in more detail. It is to be appreciated, however, that the following implementations and contexts are but some of many.

FIG. 1 illustrates an example architecture 100 that may implement a platform for assisting users in generating character recognition-based works. This platform may provide various tools and/or applications to assist users in reviewing works including automatically-made edits, to reduce the amount of manual corrections required in such works, to learn from manual corrections made by a community of users over time, to increase the accuracy of automatically-made edits in future character recognition-based works, and to provide a multitude of other services.

As shown, the architecture 100 includes a user community 102 comprising one or more users 104. The user community 102 may include users 104 such as authors, publishers, editors, content managers, or the like. Accordingly, any of the various actions described herein may be taken and/or performed by such users 104. The users 104 may be associated with creating, generating, revising, editing, correcting, finalizing and/or otherwise modifying one or more works 106 (shown as works 106A-106D in FIG. 1). Each of the works 106 may comprise a book, article, magazine, newspaper, music (e.g., song), video, film, piece of art (e.g., painting sculpture, photograph, etc.), software, or any other type of content. In some instances, the works 106 may include particular types of content (e.g., text-based content, video or image based content, etc.) and/or may be formatted for a particular format (e.g., an electronic book (eBook), a hard copy paper publication, etc.). Here, the users 104 may employ one or more computing devices 108 to create, generate, revise, edit, correct, finalize, and/or otherwise modify the works 106 and/or to interface with components of the architecture 100. Any of the works 106 described herein may, at any stage of the various editing, correction, generation, or other processes described herein, comprise character recognition-based works 106.

The users 104 may employ the devices 108 to communicate with a service provider 110 via one or more networks 112. The network 112 represents any one or combination of multiple different types of networks, such as the Internet, cable networks, wireless networks, wired networks, and so on. The service provider 110 may be implemented as one or more computing devices including servers, desktop computers, or the like. In one example, the service provider 110 is configured in a server cluster, server farm, data center, mainframe, cloud computing environment, or a combination thereof. To illustrate, the service provider 110 may operate as a cloud computing device that provides cloud services, such as storage, processing, and so on.

The service provider 110 may direct, produce and/or otherwise facilitate the output of a user interface 114 to the users 104 on the devices 108. The user interface 114 may allow the users 104 to create, generate, revise, edit, correct, finalize, and/or otherwise modify the works 106 described herein, and to perform other functions. For example, as illustrated in FIG. 1, a user 104 may provide input 116 to the one or more devices 108 to assist in generating the works 106. Such input 116 may include, for example, content from a variety of different sources including printed items, digital items, and the like. For example, text, charts, graphs, figures, and/or other printed content may be scanned or otherwise imaged, and a resulting digital file may be utilized as an input 116 to one or more applications of the present disclosure. Additionally, existing tif, gif, pdf, doc, and/or other like electronic files (i.e., digital content) may also be utilized as inputs 116 to such applications. Such inputs 116 may further include manual corrections made by the user 104 when reviewing one or more of the works 106 described herein.

In one embodiment, an example application may combine such inputs 116 into a single rough work 106A containing multiple errors. For example, an editing application or other like component of the device 108 may compile the various inputs 116 received into a single document or other like electronic file comprising the rough work 106A. In such an example, the rough work 106A may contain content from each of the inputs 116, but such content may have various alignment, formatting, image quality, and/or other like errors. Such errors may be resident in the original content of such input 116 and/or may result from the initial compilation of multiple inputs 116 from a variety of different sources. In some embodiments, the application may employ a correction engine, utilizing image recognition algorithms or other like technologies, to provide initial image enhancements, text alignment, content cropping, and/or like automatic edits when producing the rough work 106A. Such initial edits may, for example, remove noise and/or excess content resident on the initial scanned document, but not intended for use in the work 106.

In an iterative validation process, the user 104 may review and modify the rough work 106A, and in particular, the automatic edits made thereto, to generate a clean work 106B for analysis by the character recognition technologies employed by the architecture 100. For example, the user 104 may utilize the application to revise the rough work 106A by performing one or more manual corrections thereto. Such corrections may include, for example, aligning text, figures, charts, and/or other graphics contained in the rough work 106A, organizing the text into appropriate paragraphs, enhancing the quality of one or more images contained in the rough work 106A, and the like. Such manual corrections by the user 104 may result in a clean work 106B that is stored locally on the device 108 or remotely at the service provider 110. The clean work 106B may be suitable for processing by the automated text recognition technology employed by the application whereas the rough work 106A would not have been appropriate for analysis by such technologies.

For example, as will be described in greater detail below, one or more of the platforms described herein may include various modules configured to process such clean works 106B and to thereby generate a processed work 106C for further review by the user 104. In exemplary embodiments, such processed works 106C may comprise character recognition-based works generated using text recognition technology, such as optical character recognition (OCR) or other like processes. For example, one or more of the modules included in the various platforms described herein may employ an OCR engine configured to assist in generating a character recognition-based work 106. The various platforms described herein may also employ one or more additional modules configured to process the character recognition-based work, as well as one or more additional outputs of such OCR engines, to assist in generating the processed work 106C. As a result, the processed work 106C may comprise a more refined version of the initial character recognition-based work generated by the OCR engine.

Despite the advancements made in text recognition technology, errors may still exist in the processed works 106C generated by the architecture 100, and such errors must be manually corrected by the user 104 before a finalized work 106D may be produced. As a result, an example application of the present disclosure may provide one or more text images 118 of the processed work 106C for consideration by the user 104. Such text images 118 may include a plurality of edits made automatically by the application operable on the computing device 108. Some of the automatically-made edits may be accurate and, thus, accepted by the user 104 without further revision. Other automatically-made edits 120, on the other hand, may be of questionable accuracy, and such edits 120 may require manual correction by the user 104 via the user interface 114. For example, such edits 120 may include those forming a correctly-spelled word (e.g., a word passing through a spell check or other like correction engine), but having grammar, syntax, context, or other like issues requiring validation or manual correction from the user 104. As will be described in greater detail below, such edits 120 may be highlighted and/or otherwise identified to the user 104 as being of questionable accuracy such that the user 104 may provide either validation or a manual correction to the edit 120 in an efficient manner. It is understood that such manual corrections received from the user 104 may also comprise inputs 116 as described above. Further, it is understood that the automatically-made edits referred to herein may include, among other thing, any modification made to the text images 118. Such automatically-made edits may comprise, for example, a first suggestion or hypothesis made by one or more of the modules described herein employing an OCR engine. Such automatically-made edits may also comprise, for example, a revision made by one or more of the modules described herein on the basis of or in response to recognition of ink boundaries, pixels, or other characteristics of the text images 118 or of the native source of such images. Thus, such automatically-made "edits" may comprise letters, numbers, symbols, and/or other characters that are automatically and/or semi-automatically changed by the various modules described herein. For each automatically-made edit, such modules may also output respective information characterizing the edit such that the edit may be categorized, classified, grouped, sorted, recalled, and/or easily accessed for use by the modules described herein in a further editing process. Similarly, such "manual corrections" may comprise letters, numbers, symbols, and/or other characters that are manually changed by the user 104.

In one example, the automatically-made edits generated by the various modules described herein, as well as the manual corrections provided by the user 104 may comprise correction data 122 that is stored locally on each respective computing device 108. Additionally, such correction data 122 may be transferred to the service provider 110, such as via the one or more networks 112, for storage and/or use. As will be described in greater detail below, such correction data 122 may include any of the outputs generated by the various modules employed by the applications active on the computing devices 108. Such correction data 122 may also include any of the outputs generated by the various modules operable on the service provider 110. For example, manual corrections received from a user 104 may be stored at a respective computing device 108 in association with one or more corresponding outputs of modules operable and/or otherwise associated with the computing device 108. In such an example, the actual letters, numbers, symbols, and/or other characters that are manually changed by the user 104 may be stored at the computing device 108. Additionally, information including the syntax, surrounding graphics, surrounding text, and/or other characteristics identifying the context in which the manual correction was made may also be extracted and stored in connection with the manual correction. Such additional information associated with the manual correction may enable the manual correction to be categorized, classified, grouped, sorted, recalled, and/or easily accessed for use in a further editing process. Such correction data 122 may be transferred to the service provider 110 for storage therein. In one example, storing such correction data 122 at the service provider 110 may include updating and/or otherwise modifying a set of data, such as a set of global correction data, already stored at the service provider 110. Modifying a set of global correction data at the service provider 110 may enable the various platforms described herein to learn from, for example, manual corrections made to automatically-made edits over time. As a result, the modified set of global correction data may be provided to a plurality of devices 108 for use in generating additional processed works 106C containing automatically-made edits of greater accuracy. These additional processed works 106C may require fewer manual corrections from the user 104, thereby improving the efficiency of the architecture 100.

Each of the devices 108 may be implemented as any type of computing device, such as a server, a laptop computer, a desktop computer, a smart phone, an electronic reader device (e.g., an electronic book (eBook) reader device), a mobile handset, a personal digital assistant (PDA), a portable navigation device, a portable gaming device, a game console, a tablet computer, a wearable computer (e.g., smart watch, smart glasses, etc.), a portable media player, a set top box, an electronic scanner, and so on. Each of the devices 108 may include one or more network interfaces, one or more processors, memory, one or more input/output devices (e.g., mouse, keyboard, etc.), one or more cameras (e.g., rear-facing, front facing, etc.), one or more displays (e.g., touch screen), one or more sensors (e.g., accelerometer, magnetometer, etc.), and so on. The one or more processors may include a central processing unit (CPU), a graphics processing unit (GPU), a microprocessor, a digital signal processor, and so on. In one example, the service provider 110 may embody components and/or devices that are structurally, functionally, and/or operationally similar to, or the same as, those described with respect to the devices 108.

Figure 2:
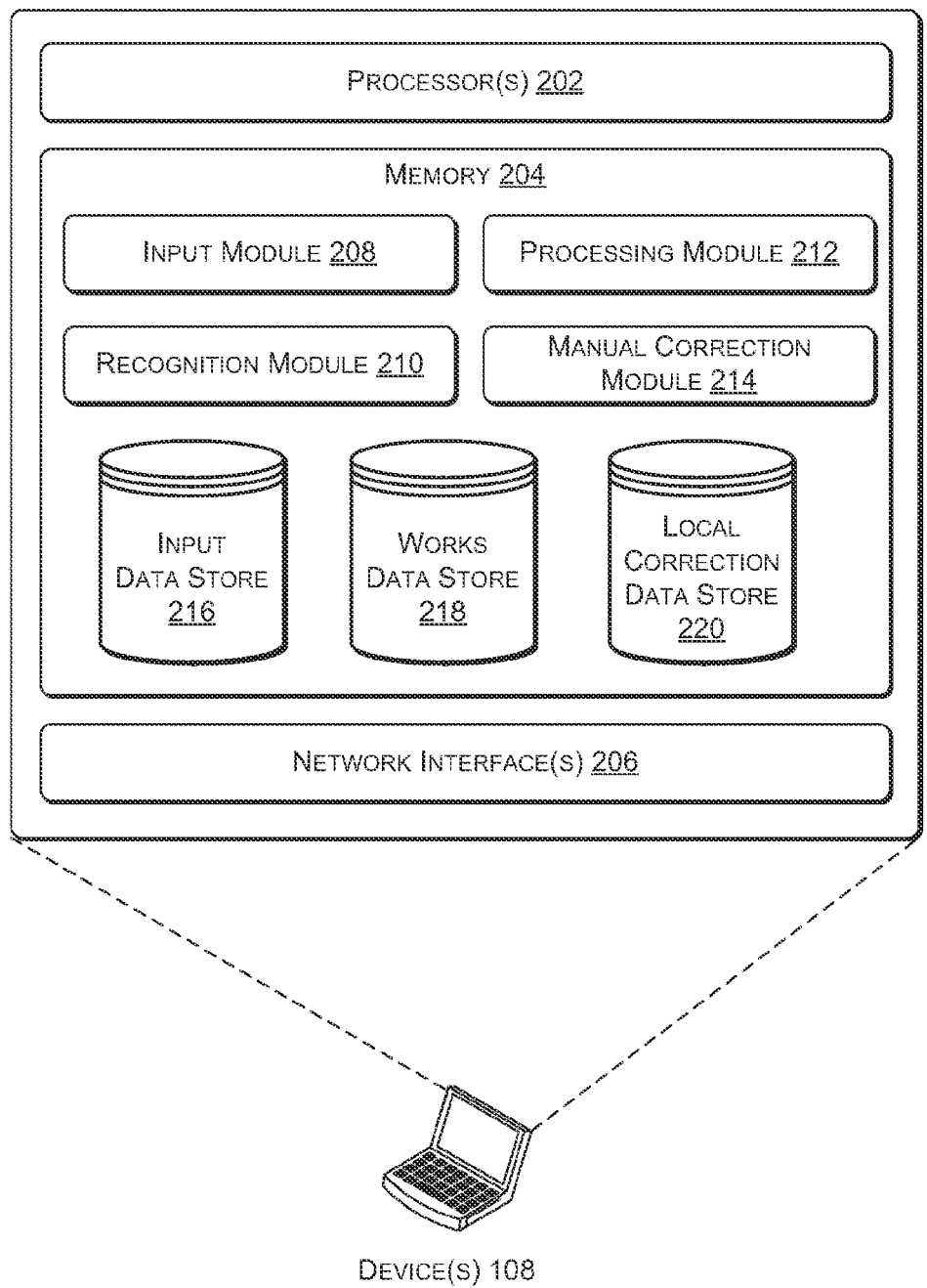
FIG. 2 illustrates details of an example computing device associated with the architecture of FIG. 1.

FIG. 2 illustrates example details of the computing devices 108 shown in FIG. 1. As noted above, the computing devices 108 may assist users 104 in preparing works 106, and may perform other functions. In some instances, one or more computing devices 108 may be equipped with one or more processors 202, memory 204 communicatively coupled to the one or more processors 202, and one or more network interfaces 206. The one or more processors 202 may include a central processing unit (CPU), a graphics processing unit (GPU), a microprocessor, a digital signal processor, and so on. The memory 204 may include software and/or firmware functionality configured as one or more "modules." The term "module" is intended to represent example divisions of the software and/or firmware for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 2, the memory 204 may include an input module 208, a recognition module 210, a processing module 212, and a manual correction module 214. The modules 208-214 may be executable by the one or more processors 202 to perform various operations.

The input module 208 may assist in receiving and processing information related to the generation of various works 106. In one example, the input module 208 may be configured to collect, store, and/or access information associated with each of the inputs 116 described herein. For example, the input module 208 may be configured to receive text, charts, graphs, figures, and/or other content that is scanned or otherwise imaged by the user 104. The input module 208 may also be configured to receive one or more tif, gif, pdf, doc, and/or other like electronic files from the user 104. The input module 208 may also be configured to collect, store, and/or access a set of data, such as a set of global correction data 122 received from the service provider 110. The input module 208 may direct such input 116 and/or such correction data 122 to one or more of the recognition module 210, the processing module 212, and the manual correction module 214. Accordingly, each of the modules 208-214 may be operably connected via the input module 208. The input module 208 may also direct such input 116 and/or such correction data 122 to one or more data stores associated with the memory 204 for storage therein.

In one example, a user interface, similar to the user interface 114 described above with respect to FIG. 1, may be provided by the input module 208, and accessible via the devices 108, to allow users 104 to provide input 116 for use in generating a work 106. The input module 208 may store such input 116 in an input data store 216. Additionally, the input module 208 may be configured to interface with the service provider 110 such that input 116 received by the input module 208 and/or stored in the input data store 216 may be transferred to the service provider 110. Additionally, through such interface with the service provider 110, the set of global correction data provided by the service provider 110 for use in one or more applications operable on the processor 202 may be received by the input module 208 and appropriately stored in the memory 204.

The recognition module 210 may be configured to receive input 116 stored in, for example, the input data store 216, and may be configured to generate one or more of the works 106 described herein based on such input. For example, the recognition module 210 may include one or more sub-modules (not shown) configured to generate one or more of the rough works 106A, the clean works 106B, the processed works 106C, and/or the finalized works 106D described herein. Alternatively, one or more of the other modules 208, 212, 214 described herein may also be configured to assist in generating one or more such works 106A-106D, and such works may be temporarily and/or permanently stored within a works data store 218 of the memory 204. For example, upon receiving a variety of inputs 116, the input module 208 may compile such inputs 116 and generate a rough work 106A for initial review by a user 104. Such a rough work 106A may be stored temporarily within the works data store 218, and through an iterative process, the user 104 may provide manual corrections to the rough work 106A, thereby producing a clean work 106B. The resulting clean work 106B may be stored, at least temporarily, in the works data store 218.

In such an embodiment, the recognition module 210 may utilize the clean work 106B as an input for processing. In particular, the recognition module 210 may include a character recognition engine, such as an optical character recognition engine, configured to process the clean work 106B and to generate one or more corresponding outputs. In one example, the recognition module 210 may process the clean work 106B, and may generate a character recognition-based work 106 including one or more edits automatically made by the recognition module 210. As will be described in greater detail below with respect to FIG. 4, the recognition module 210 may provide, as respective outputs thereof, a Unicode associated with each character of the automatically-made edits included in the character recognition-based work 106, a location and/or bounds associated with each character of the automatically-made edits and indicative of a location of the respective character on the text image 118 of the work 106, a confidence score associated with each character of the automatically-made edits and indicative of an accuracy of the edit, one or more alternate suggested edits associated with each automatically-made edit, and/or a respective confidence score associated with each alternate suggested edit. In further examples, the recognition module 210 may be configured to generate one or more additional such outputs associated with the character recognition-based work 106. Accordingly, in addition to the character recognition-based work 106, such outputs may be referred to collectively as "the one or more outputs" of the recognition module 210.

It is understood that the one or more outputs of the recognition module 210 may be known and/or understood by those skilled in the art of character recognition technology. Accordingly, such outputs will not be described in great detail herein. However, for ease of discussion, it is understood that a Unicode is a computing industry standard for the consistent encoding, representation and handling of text expressed in most international writing systems. In one example, a unique Unicode may comprise a series of numbers, letters, or other like nomenclatures associated with each character of the automatically-made edit included in the processed work 106C. The bounds of each character of the automatically-made edit may comprise, for example, coordinates, grid lines, cross points, and/or other like identifiers indicative of the location and/or boundary of each character is shown in the text image 118. The confidence score may be a numeric metric, on a predetermined scale (such as from 0.0 to 1.0), indicative of the likelihood that the corresponding automatically-made edit is accurate. Such confidence scores may be automatically generated by the recognition module 210 as an output thereof, and the determination of such confidence scores is described in greater detail in co-owned U.S. patent application Ser. No. 13/612,273, filed on Sep. 12, 2012, the entire disclosure of which is expressly incorporated herein by reference. Moreover, such alternate suggested edits may include one or more symbols, characters, and the like having a shape, contour, and/or appearance similar to the corresponding character of the automatically-made edit. For example, if the automatically-made edit includes incorporating the letter "o" at a portion of the processed work 106C, the recognition module 210 may output example alternate suggested edits including the letters "c" and "q," each of which have a similar shape, contour, and/or appearance to the letter "o." In such an example, the recognition module 210 may also output a confidence score for each alternate suggested edit, similar to the confidence score described above, indicative of the respective likelihood that the corresponding alternate suggested edit is accurate. As noted above, the one or more outputs of the recognition module 210 may be stored in the works data store 218.

The processing module 212 may be configured to analyze, revise, and/or otherwise process the one or more outputs of the recognition module 210. In one example, the operations performed by the processing module 212 may result in a filtered, and/or otherwise finely-tuned processed work 106C, and it is understood that the processed works 106C described herein as being manually reviewed, revised, and/or otherwise corrected by the one or more users 104 may comprise outputs of the processing module 212. In this way, the processing module 212 may act as a post-processing application configured to modify the one or more outputs of the recognition module 210, such as a character recognition-based work 106 generated by the recognition module 210 without modifying and/or affecting operation of the recognition module 210.

In one example, the processing module 212 may be configured to identify one or more of the automatically-made edits, generated by the recognition module 210, as being of questionable accuracy. The processing module 212 may make such a determination based on, for example, analysis and/or evaluation of the one or more outputs of the recognition module 210. For example, the one or more outputs of the recognition module 210 may be evaluated by the processing module 212 relative to respective corresponding thresholds or other like metrics to determine whether such automatically-made edits are of sufficient accuracy or are of questionable accuracy. In one example, the processing module 212 may identify one or more of the automatically-made edits as being of questionable accuracy based on the confidence score assigned to the respective automatically-made edit by the recognition module 210. For example, if the processing module 212 determines that an automatically-made edit has a corresponding confidence score below a correspondence score threshold, the processing module 212 may identify the respective edit as being of questionable accuracy (e.g., suspicious), and may highlight and/or otherwise indicate the edit to the user 104 such that the user 104 may review the edit and provide manual correction if required. Indicating such an edit to the user 104 may include, for example, circling, underlining, highlighting, changing color, and/or otherwise distinguishing the suspicious edit in the text image 118 viewed by the user 104 via the user interface 114 such that the user 104 may review the processed work 106C with increased efficiency.

The processing module 212 may also be configured to generate, extract, and/or otherwise determine a unique character signature associated with the automatically-made edit identified as being of questionable accuracy. For example, the processing module 212 may extract one or more of a shape identifier, a boundary identifier, a location identifier, and/or other like unique feature indicative of a character included in the automatically-made edit and, in particular, of the automatically-made edit identified as being of questionable accuracy. It is understood that determining such a unique character signature may be done utilizing any of a variety of features or other characteristics of a character included in the edit. For example, a shape context process may be utilized by the processing module 212 to extract such a character signature associated with each character of the automatically-made edit. In an example shape context process, the processing module 212 may extract a unique character signature associated with one or more regions the text image 118 in which the character is located. For example, the processing module 212 may divide the text image 118 into a plurality of regions, quadrants, grids, and the like. The processing module 212 may then determine the number of pixels, points, or other aspects of the character disposed within each region, quadrant, and/or grid section. By identifying, for example, the number of character points disposed within each grid section, the shape and/or contour of each character included in the automatically-made edit may be uniquely identified. Further, once such a unique character signature has been extracted, the processing module 212 may associate the character signature with the automatically-made edit. In particular, the processing module 212 may store the character signature in association with the one or more outputs of the recognition module 210 corresponding to the automatically-made edit.

The manual correction module 214 may be configured to receive manual corrections from the user 104 as the user 104 reviews the processed work 106C output by the processing module 212. For example, the manual correction module 214 may receive a manual correction made to the automatically-made edit of questionable accuracy. The manual correction module 214 may direct the manual correction made by the user 104 to a local correction data store 220 of the memory 204 for storage therein.

In one example, upon reviewing the one or more automatically-made edits contained in the processed work 106C, the user 104 may notice that the recognition module 210 or the processing module 212 inserted the characters "cl" instead of the character "d," and as a result, included the word "clown" instead of the word "down" into the processed work 106C. Such an exemplary edit 120 is sown in FIG. 1. The processing module 212 may identify this edit 120 as being of questionable accuracy, and upon review of the processed work 106C, the user 104 may manually replace the characters "cl" with the character "d." The manual correction module 214 may store this manual correction in the local correction data store 220 for use by the recognition module 210 and/or the processing module 212 in generating future character recognition-based works 106 that are different than the current work being processed. The local correction data store 220 and/or the manual correction module 214 may also make such a manual correction available for use by one or more additional computing devices 108 and/or one or more additional users 104 via the service provider 110.

In one example, the manual correction module 214 may store such a manual correction at the local correction data store 220 in association with the one or more outputs of the recognition module 210 and/or with outputs of the processing module 212. For example, the manual correction module 214 may cause the manual correction received from the user 104 to be stored in the local correction data store 220 in association with the unique character signature, the Unicode, the confidence score of the automatically-made edit, the alternate suggested edits, and/or other outputs described herein. In this way, storing the character signature together with such corresponding outputs may increase the efficiency with which such items of correction data 122 may be recalled during generation of future works 106. In another example, the manual correction module 214 may group the manual correction together with one or more additional stored manual corrections based on a similarity, correlation, and/or other known match between the manual corrections and/or between the outputs associated there with. For example, when storing the manual correction in the local correction data store 220, the manual correction module 214 may group the manual correction and/or one or more respective characters associated therewith, with one or more additional stored manual corrections based on a match between the character signature of the automatically-made edit currently being corrected and respective character signatures of previous automatically-made edits associated with one or more manual corrections already stored in the local correction data store 220. Grouping manual corrections in this way may further assist in increasing the efficiency with which such correction data 122 may be recalled.

In an example embodiment, the manual correction module 214 may compare the character signature of the automatically-made edit currently being corrected with respective character signatures of one or more additional manual corrections stored in the local correction data store 220. In such an embodiment, the comparison may be made on a pixel-by-pixel basis such that locations, sizes, values, colors, and/or other characteristics of pixels of the character signature of the automatically-made edit may be compared with corresponding characteristics of pixels of the one or more additional stored manual corrections. The manual correction module 214 may also determine, based on the comparing, a match between the character signature of the at least one edit and the respective character signatures of the one or more additional stored manual corrections. It is understood that in an example embodiment, such a "match" may be determined based on the character signature of the at least one edit and the respective character signatures of the one or more additional stored manual corrections having a number of "pixels in common," and the number of pixels in common being greater than a common pixel threshold.

For example, in an embodiment in which the common pixel threshold is equal to 50, a match may be determined based on the character signature of the at least one edit and the respective character signatures of one or more of the additional stored manual corrections each having at least 50 corresponding pixels that include and/or are otherwise characterized by the same location, size, color, value, and/or other common pixel characteristic. This analysis may be done by the manual correction module 214 on a pixel-by-pixel basis. Additionally, in further embodiments, the common pixel threshold may be greater than 50 or less than 50. The manual correction module 214 may group one or more revised characters associated with the character signature with the one or more additional stored manual corrections based at least in part on the determined match. It is also understood that in further embodiments, additional methods or techniques may be used to determine a match between character signatures and/or actual characters, and in such embodiments, the additional methods may be related to the particular shape identifier, boundary identifier, location identifier, and/or other character signature employed.

Figure 3:
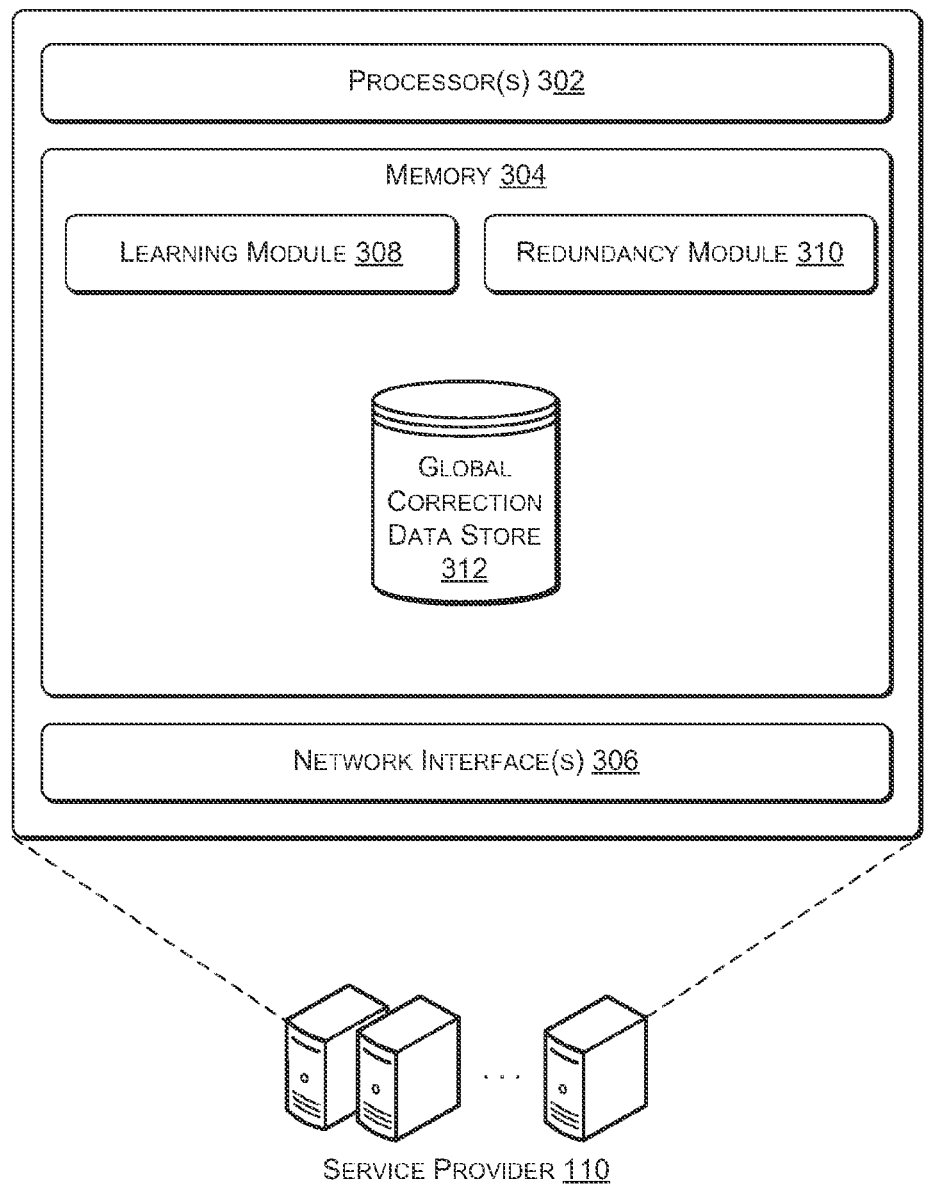
FIG. 3 illustrates details of an example service provider associated with the architecture of FIG. 1.

FIG. 3 illustrates example details of the service provider 110 shown in FIG. 1. The service provider 110 may be associated with an online retailer, such as a retailer that offers works 106 or other items for acquisition. While in other instances, the service provider 110 is associated with another service and/or is implemented as an independent service. The service provider 110 may be distributed across multiple locations and/or devices.

As discussed above, the service provider 110 may be implemented as one or more computing devices. The one or more computing devices of the service provider 110 may be equipped with one or more processors 302, memory 304 communicatively coupled to the one or more processors 302, and one or more network interfaces 306. Similar to the computing devices 108 described above, the one or more processors 302 may include a CPU, a GPU, a microprocessor, a digital signal processor, and so on. The memory 304 may include software and/or firmware functionality configured as one or more modules. As illustrated in FIG. 3, the memory 304 may include a learning module 308 and a redundancy module 310, as well as other modules known in the art. The modules 308, 310 may be executable by the one or more processors 302 to perform various operations.

The learning module 308 may be configured to manage the input, modification, and/or output of correction data 122. For example, the learning module 308 may be in communication with a global correction data store 312 of the memory 304. The learning module 308 may be configured to receive correction data 122 from the user community 102, and to store such correction data 122 in the global correction data store 312. In particular, the learning module 308 may be in communication with each of the computing devices 108 via the networks 112 and the network interface 306. Each of the devices 108 may push correction data 122 to the learning module 308 at regular intervals, in real time, or in response to requests sent by the learning module 308. As will be described in greater detail below, the learning module 308 may modify the set of global correction data stored in the global correction data store 312 upon receiving correction data 122 from the plurality of computing devices 108. Additionally, the learning module 308 may manage distribution of correction data 122 among the connected devices 108. Such distributed correction data 122 may be stored, for example, in the local correction data stores 220 described above for use by the various modules 208-214 in generating the works 106 described herein. Since correction data 122, including manual corrections received from the various users 104, is continually updated by the learning module 308, stored in the global correction data store 312, and distributed to the devices 108 for use, the accuracy of automatically-made edits generated by the various modules 208-214 may increase over time.

The learning module 308 may utilize one or more algorithms to determine whether or not to modify the set of global data stored in the global correction data store 312. Such algorithms may assist the learning module 308 in determining, for example, whether correction data 122 received from the various computing devices 108, and associated with a particular user's 104, is accurate and/or otherwise reliable. For example, such algorithms may give greater priority to correction data 122 received from users 104 having a history of making accurate manual corrections to erroneous automatically-made edits during their review of processed works 106C. Likewise, such algorithms may give a relatively lower priority to correction data 122 received from users 104 having a history of making inaccurate manual corrections to automatically-made edits. In one example, one or more of the algorithms utilized by the learning module 308 may include weights associated with the respective terms thereof. Alternatively, such weights may be assigned to the items of information used as inputs to such algorithms and/or to the individual users 104 associated with such information. In any of the examples described herein, the weights may be indicative of the importance of the item of information to the final calculation. For example, items of information that are highly relevant to determining whether or not to modify the set of global correction data stored in the global correction data store 312 may be given a greater weight than items of information that are not highly relevant to such a determination.

In one example, a weight may be assigned to each respective user 104 associated with the received correction data 122 and/or two the manual corrections included in the correction data 122. Such weights may be modified over time in accordance with the accuracy of the manual corrections made by the user 104, and such weights may be incorporated into the algorithms utilized by the learning module 308 to determine whether or not modifications to the set of global correction data stored in the global correction data store 312 should be made.

For example, in determining whether to modify the set of global correction data stored in the global correction data store 312, the learning module 308 may determine that correction data 122 received from a first user 104 includes a first manual correction to a first automatically-made edit having a confidence score below a confidence score threshold. Since the confidence score of the first automatically-made edit is below the confidence score threshold, the first automatically-made edit is likely to be erroneous, and the first manual correction made by the first user 104 is, thus, likely proper. The learning module 308 may also determine that the same first user 104 accepted a second automatically-made edit having a confidence score above the confidence score threshold without providing a corresponding manual correction. Since the confidence score of the second automatically-made edit is above the confidence score threshold, the second automatically-made edit is likely to be accurate, and thus, no corresponding manual correction was likely to be required. By analyzing such correction data 122, the learning module 308 may assign a first weight to manual corrections provided by the first user 104 and/or to the manual corrections themselves, and this first weight may be greater than a second weight assigned to a second user 104 having a history of making relatively less accurate manual corrections.

For example, the learning module 308 may assign the second weight to the second user 104 in response to the second user 104 providing a third manual correction to a third automatically-made edit having a confidence score above the confidence score threshold, and determining that the second user 104 accepted a fourth automatically-made edit having a confidence score below the confidence score threshold without providing a corresponding manual correction to the fourth edit. In the above example, the third automatically-made edit was likely to be accurate since the corresponding confidence score was above the confidence score threshold. Thus, the third manual correction made by the second user 104 may have been improper. Moreover, since the confidence score of the fourth automatically-made edit was below the confidence score threshold, the fourth automatically-made edit may have been improper, yet the second user 104 accepted this automatically-made edit without making a manual correction. Such a manual correction history of the second user 104 may call the reliability of manual edits made by the second user 104 into question. Accordingly, the respective weight given to correction data 122 and/or two particular users 104 may be modified by the learning module 308 as part of modifying the set of global correction data stored in the global correction data store 312. As part of this process, the learning module 308 may utilize, among other things, the confidence scores, described herein with respect to FIG. 2, automatically generated as an output of the recognition module 210.

The redundancy module 310 may be in communication with the learning module 308 and/or the global correction data store 312, and may be configured to provide an additional level of analysis in determining whether or not to modify the set of global correction data stored in the global correction data store 312. For example, upon receiving correction data 122 including a manual correction, and an associated image feature, Unicode, and/or other such information, the redundancy module 310 may search the global correction data store 312 to determine whether a matching image feature exists therein. If not, the manual correction and/or its associated information may be a new manual correction, and the redundancy module 310 may update the global correction data store 312 by adding the manual correction and its associated information to the set of global correction data stored therein. Alternatively, if a matching image feature does exist in the global correction data store 312, the redundancy module 310 may determine that the new manual correction is redundant, and therefore, no modifications to the set of global correction data stored in the global correction data store 312 may be required. However, it is understood that upon determining such redundancy, the redundancy module 310 may increase a weight given to the particular user 104 providing the new manual correction, and/or to the manual correction itself. Such an increased weight may be utilized in one or more of the algorithms described above with respect to the learning module 308.

While many operations are described herein as being performed by the service provider 110, any of these operations may be performed by other devices, such as the devices 108. As such, the devices 108 may include any of the modules 308, 310 described herein with respect to the service provider 110. Furthermore, while various operations are described as being performed by modules, any of these operations, and/or other techniques described herein, may be implemented as one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc.

The memory 204, 304 (as well as all other memory described herein) may include one or a combination of computer-readable media (e.g., storage media). Computer-readable media includes volatile and non-volatile, removable and non-removable media implemented in any method or technology for storage of information, such as computer readable instructions, data structures, program modules, or other data. Computer-readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves. As such, computer-readable media comprises non-transitory computer-readable media.

Figure 4:
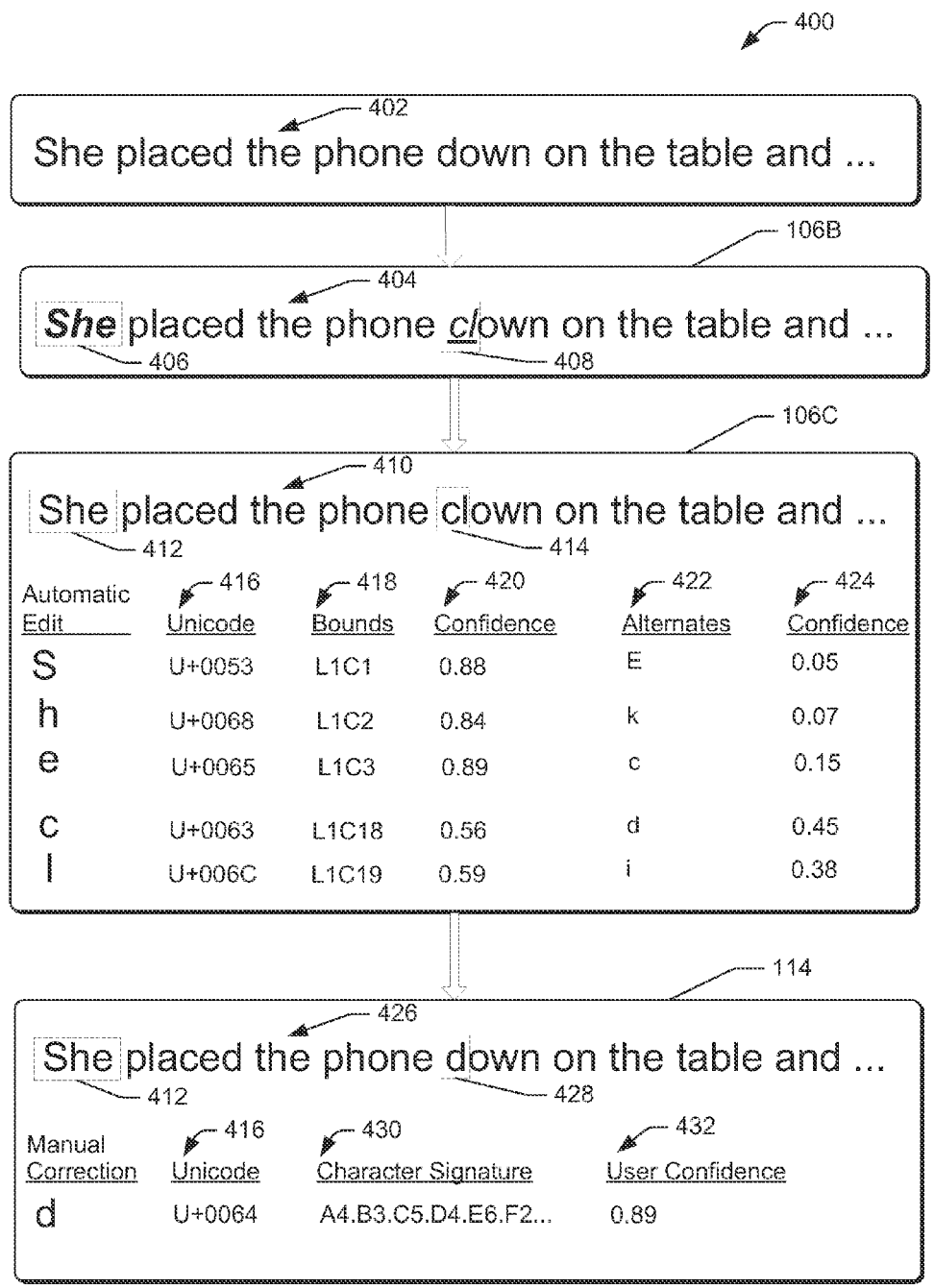
FIG. 4 illustrates example text images and corresponding edits or corrections.

FIG. 4 illustrates an example interface 400 that may be presented to implement various techniques described herein. The interface 400 may be provided via a web browser, application (e.g., mobile application, desktop application, etc.), and so on. In particular, the interface 400 may be presented on any of the devices 108 of the architecture 100 shown in FIG. 1. Further, while the interface 400 illustrates various items of information at various revision stages, these items of information may be presented on multiple and/or different pages or, alternatively, on the same page.

In one example, the interface 400 may illustrate a text image 402 representative of accurate text. As shown in FIG. 4, the text image 402 may not contain any errors and, thus, may be representative of a desired output of the processing module 212 (FIG. 2).

The interface 400 also illustrates a text image 404 representative of a line of text scanned, imaged, and/or otherwise received as an input 116 to the interface 400. Such a text image 404 may be representative of, for example, a portion of a clean work 106B that has received alignment, formatting, and/or other coarse revisions from a user 104. Accordingly, the text image 404 may still include one or more additional errors 406, 408 requiring correction. Such errors 406, 408 may comprise spelling, grammar, context, syntax, font, and/or other like errors resulting from the scanning, imaging, and/or other processes utilized to input content from various sources. Such errors 404, 408 may also be resident on the original document or content item utilized as a source for such input 116.

The interface 400 further illustrates a text image 410, corresponding to the text image 404. The text image 410 is representative of the line of text from the clean work 106B after being processed by the recognition module 210 and the processing module 212 to form a processed work 106C. As shown in FIG. 4, the errors 406, 408 contained in the text image 404 have been automatically edited in the processed work 106C. While the first error 406 (a formatting error) has been replaced by a correct automatically-made edit 412, the second error 408 has not been fully corrected. In particular, a second automatically-made edit 414 has been made to the text image 410 of the processed work 106C to correct a formatting error, but the second edit 414 still includes a context error. In this example, the word "clown," while spelled correctly, should have been replaced with the word "down" in order to match the context of the sentence. Accordingly, the second automatically-made edit 414 will require manual correction by the user 104.

FIG. 4 also illustrates the one or more outputs of the recognition module 210 (FIG. 2) described above associated with each of the automatically-made edits 412, 414. In particular, for each character of the respective automatically-made edits 412, 414, the recognition module 210 may output at least one of a corresponding Unicode 416, a bounds of the character 418, a confidence score 420, alternate suggested edits 422, and a confidence score 424 corresponding to each respective alternate suggested edit 422. As noted above, the one or more outputs 416, 424 of the recognition module 210 may be utilized as inputs to the processing module 212 in generating the processed work 106C. Although FIG. 4 illustrates the one or more outputs 416-424 as being part of the processed work 106C, in further examples, the one or more outputs 416-424 may be provided to the user 104, and/or to the processing module 212 separate from the character recognition-based work 106 generated by the recognition module 210. As noted above, the one or more outputs 416-424 may also be stored in the works data store 218 (FIG. 2).

The interface 400 further illustrates a text image 426, corresponding to the text image 410. The text image 426 is representative of the line of text from the processed work 106C after being manually corrected by the user 104. For example, the correct automatically-made edit 412 has been accepted by the user 104 and remains unchanged in the text image 426. On the other hand, the incorrect automatically-made edit 414 has received a manual correction 428 from the user 104 to correct the context error associated with the automatically-made edit 414.

FIG. 4 also illustrates the one or more outputs of the processing module 212 (FIG. 2) described above associated with the automatically-made edit 414. In particular, FIG. 4 illustrates the manual correction 428 corresponding to the automatically-made edit 414 (in this example, the character "d"), one or more of the Unicodes 416 associated with the automatically-made edit 414, and a unique character signature 430 associated with the automatically-made edit 414. FIG. 4 further illustrates a confidence score 432 associated with the particular user 104 that provided the manual correction 428. Although FIG. 4 illustrates the Unicode 416, character signature 430, and confidence score 432 as being part of and/or displayed on the user interface 114, in further examples, the Unicode 416, character signature 430, and/or confidence score 432 may be provided to the works data store 218 and/or the local correction data store 220 for storage therein without being provided to the user 104.

Figure 5:
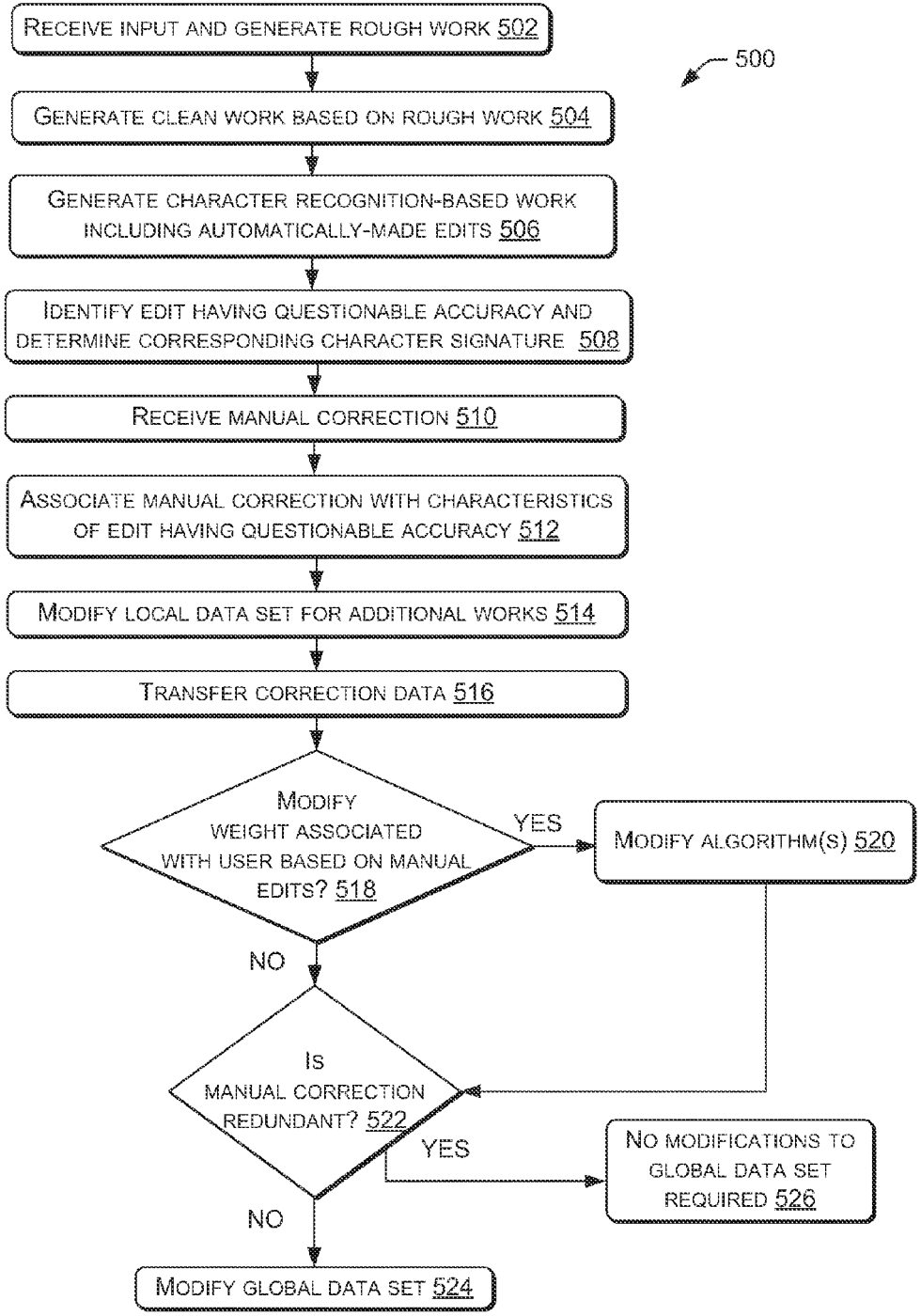
FIG. 5 illustrates an example process for generating a character recognition-based work and modifying a global data set.

FIG. 5 illustrates an example process 500 for assisting a plurality of users 104 in preparing works 106, and for updating and/or modifying a global data set for use by a plurality of users 104 in generating additional works 106. For ease of illustration the process 500 is described as being performed in the architecture 100 of FIG. 1. For example, one or more of the individual operations of the process 500 may be performed by the users 104, the devices 108, and/or the service provider 110. However, the process 500 may be performed in other architectures. Moreover, the architecture 100 may be used to perform other processes.

The process 500 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the operations may be omitted.

At 502, the one or more devices 108 may receive input 116 from a respective user 104 thereof, and the device 108 may use the input 116 to generate a rough work 106A. As noted above, such input 116 may include, for example, content from a variety of different sources including printed items, digital items, and the like. For example, text, charts, graphs, figures, and/or other content may be scanned or otherwise imaged, and a resulting digital file may be utilized as an input 116 at 502. Additionally, existing tif, gif, pdf, doc, and/or other like electronic files may also be utilized as inputs 116 at 502.

Upon receiving such input 116, the device 108 may organize and/or otherwise compile the input 116 into a singular working document or other like file comprising the rough work 106A. In one example, the input 116 may be received by the input module 208 of the device 108, and the input module 208 may generate the rough work 106A based on the input 116. The input module 208 may also store, at least temporarily, the rough work 106A in the input data store 216.

As such rough work 106A may not be suitable for analysis by the recognition module 210 or the processing module 212, the input module 208 may generate a clean work 106B based on the rough work 106A at 504. In one example, the user 104 may provide intermittent manual corrections or other like feedback to the input module 208 to assist in generating the clean work 106B. For example, the input module 208 may provide the user 104 with portions of the work having various automatically-made edits, but also including a number of alignment, formatting, image quality, and/or other errors. Upon reviewing such errors, the user 104 may provide a number of manual corrections, and in response, the input module 208 may provide the user 104 with additional portions of the work for review. Accordingly, the input module 208 may generate the clean work 106B at 504, with the assistance of the user 104, through such an iterative process.

At 506, the recognition module 210 may generate a character recognition-based work 106 including a plurality of automatically-made edits. As described above, such a character recognition-based work 106 generated by the recognition module 210 may be directed to the processing module 212, and the processing module 212 may generate a corresponding processed work 106C based thereon. In one example, the character recognition-based work 106 generated by the recognition module 210 may include some automatically-made edits that are accurate, and others that are inaccurate. Additionally, as described with respect to FIG. 4, in generating such a character recognition-based work 106 at 506, the recognition module 210 may also output a Unicode 416 associated with each character of the various automatically-made edits, a bounds of each such character 418, a confidence score 420 associated with each such character, one or more alternate suggested edits 422 associated with each such character, and a respective confidence score 424 associated with each alternate suggested edit 422. These one or more edits of the recognition module 210 may also be provided to the processing module 212 and/or may be stored in the works data store 218.

At 508, the processing module 212 may identify at least one of the automatically-made edits included in the character recognition-based work 106 generated by the recognition module 210 as having questionable accuracy. In one example, the processing module 212 may compare the confidence score associated with each character of the respective automatically-made edits to a confidence score threshold. Through such a comparison, the processing module 212 may identify edits having a confidence score above the confidence score threshold as having acceptable accuracy. Likewise, the processing module 212 may identify edits having a confidence score below the confidence score threshold as being of questionable accuracy. The processing module may, for example, highlight, and/or otherwise identify such edits of questionable accuracy to the user 104 in any known way.

At 508, the processing module 212 may also extract and/or otherwise determine a unique character signature for each automatically-made edit determined to be of questionable accuracy. In one example, such a character signature may include a shape context and/or any other known identifier configured to uniquely characterize the shape, boundary, location, and/or any other characteristics associated with a character of the automatically-made edit. Once extracted at 508, the character signature may be associated and/or stored with the corresponding one or more outputs of the recognition module 210.

At 510, the processing module 212 and/or the manual correction module 214 may present the processed work 106C to the user 104 for review, and the manual correction module 214 may receive one or more manual corrections from the user 104. In particular, the user 104 may provide manual corrections to one or more of the identified automatically-made edits having questionable accuracy. It is understood, however, that some of the manual corrections received from the user 104 may be accurate while others may be inaccurate. Thus, each user 104 may, over time, develop a reliability and/or correction history, and as will be described in greater detail below, such previous manual corrections by the user 104 may be utilized in determining whether or not to modify a set of global correction data. It is understood that at 510, such manual corrections may be received from the user 104 via the various user interfaces 114 of the devices 108 described herein.

At 512, the manual correction module 214 may associate each manual correction received from the user 104 with one or more characteristics of the corresponding automatically-made edit having questionable accuracy. For example, at 512 the manual correction module 214 may associate the character signature determined at 508, as well as the Unicode, bounds, confidence score, and/or other outputs of the recognition module 210 corresponding to the automatically-made edit, with the respective manual correction.

At 514 the manual correction module 214 may update and/or otherwise modify a local set of correction data 122 stored in the local correction data store 220 to include the manual correction made by the user 104. The manual correction module 214 may, for example, direct the manual correction made by the user 104 to the local correction data store 220 for storage in association with the Unicode and/or other corresponding outputs of the recognition module 210. In this way, the manual correction may be configured for use by the local device 108 in generating additional automatically-made edits in an additional (i.e., different) character recognition-based work 106.

In one example, the manual corrections stored at 514 may be used to generate a second plurality of automatically-made edits in a second (e.g., different) character recognition-based work 106. In such a process, steps 508-512 may be repeated in view of the additional work 106. For example, at least one automatically-made edit in the additional work 106 may be identified by the processing module 212 based on a confidence score of the automatically-made edit in the additional work 106. Additionally, the processing module 212 may determine that a Unicode of the automatically-made edit in the additional work 106 matches a stored Unicode of an automatically-made edit from the prior work 106. The processing module 212 may, in response, also automatically replace the automatically-made edit in the additional work 106 to match a stored manual correction from the prior work 106 associated with the stored Unicode. Moreover, automatically correcting the edits in such an additional work 106 may include the processing module 212 determining that automatically correcting such edits to match a stored manual correction results in a correctly spelled word. Automatically correcting the edits in such an additional work 106 may also include the processing module 212 determining that the stored manual correction comprises an alternate suggested edit associated with an automatically-made edit in the first work 106 and that the alternate suggested edit has a respective confidence score above a confidence score threshold.

At 516, the device 108 may, under control of the processor 202 and/or the network interface 206, transfer at least a portion of the correction data 122 stored in the local correction data store 220 to the service provider 110 by way of the network 112. For example, the device 108 may transfer any of the new manual corrections recently added to the local correction data store 220, and any corresponding outputs of the recognition module 210 stored in association therewith, to the service provider 110 at 516.

At 518, the service provider 110 may begin to determine whether the set of global correction data stored in the global correction data store 312 should be modified based on the correction data 122 received at 516. In one example, at 518 the learning module 308 may determine whether to modify one or more weights associated with the user 104 from which the manual corrections were received at 510. Such a determination may be made based on, among other things, the manual correction history of the user 104, and the confidence score associated with respective automatically-made edits generated by the recognition module 210 and/or the processing module 212. In one example, at 518 the learning module 308 may determine that the user 104 provided a first manual correction to a first automatically-made edit having a confidence score below a confidence score threshold (and thus, likely inaccurate), and that the user 104 also accepted a second automatically-made edit having a confidence score above the confidence score threshold (and thus, likely accurate) without providing a corresponding manual correction thereto. In response to such a determination (518-yes), the learning module 308 may modify one or more algorithms utilized to determine whether or not to modify the set of global correction data stored in the global correction data set store 312. In particular, in response to such a determination the learning module 308 may, at 520, increase a weight associated with the particular user 104, and/or with manual corrections provided by the user 104, relative to additional users 104 having a history of providing relatively less accurate manual corrections.

Alternatively, if at 518 the learning module 308 determines that the user 104 provided a first manual correction to a first automatically-made edit having a confidence score above a confidence score threshold (and thus, likely accurate), and that the user 104 also accepted a second automatically-made edit having a confidence score below the confidence score threshold (and thus, likely inaccurate) without providing a corresponding manual correction thereto, the learning module 308 may, at 520, modify one or more of the algorithms described above by decreasing a weight associated with the particular user 104, and/or with the manual corrections provided by that user 104, relative to additional users 104 having a history of providing relatively more accurate manual corrections. Such determinations made at 518 may assist in avoiding incorporating erroneous manual corrections into the set of global correction data stored in the global correction data store 312, and such determinations may be made based on the confidence scores described above automatically generated by the recognition module 210.

On the other hand, if neither of the above conditions exist (518-no) control may proceed to 522 where the redundancy module 310 may determine whether the manual correction included in the correction data 122 is redundant to manual corrections already stored in the global correction data store 312. For example, the redundancy module 310 may review the correction data 122 received from the one or more devices 108 to determine whether a manual correction and/or a character signature included therein already exists in the global correction data store 312. If so (522-yes) such redundant correction data 122 may not be added to the set of global correction data at 526. However, in one example, a confidence score associated with the redundant correction data 122 may be increased by the redundancy module 310 in order to indicate an increased likelihood that the corresponding automatically-made edit was accurate. On the other hand, if the redundancy module 310 determines that a manual correction and/or character signature associated with the correction data 122 does not already exist in the global set of correction data (522-no), the redundancy module 310 may modify the set of global correction data at 524 by, for example, adding the correction data 122 to the global set of correction data. In one example, the redundancy check at 522 may further increase the efficiency of the various architectures described herein by substantially eliminating duplicate information in the set of global correction data.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
  generating, by one or more computing devices, a first character recognition-based work including a first plurality of automatically-made edits made by the one or more computing devices, each edit of the first plurality of edits being characterized by a Unicode and a confidence score;
  comparing the respective confidence scores of the first plurality of automatically-made edits to a confidence score threshold;
  identifying at least one edit of the first plurality of automatically-made edits as having a respective confidence score below the confidence score threshold;
  characterizing the at least one edit of the first plurality of automatically-made edits as being of questionable accuracy based at least in part on the respective confidence score of the at least one edit being below the confidence score threshold;
  determining a character signature of the at least one edit, wherein the character signature comprises one or more of a shape identifier, a boundary identifier, or a location identifier, and wherein the character signature is indicative of a character of the at least one edit;
  receiving, from a first user of the one or more computing devices, a correction made to the at least one edit, the correction comprising one or more revised characters;
  storing, at the one or more computing devices, the one or more revised characters in association with the character signature and the Unicode of the at least one edit; and
  generating, using the one or more revised characters, a second plurality of automatically-made edits in a second character recognition-based work, wherein
    the second character recognition-based work is different than the first character recognition-based work.

2. The method of claim 1, wherein storing, at the one or more computing devices, the one or more revised characters in association with the character signature and the Unicode of the at least one edit includes:
  comparing, on a pixel-by-pixel basis, the character signature of the at least one edit with respective character signatures of one or more additional stored manual corrections;

determining, based on the comparing, a match between the character signature of the at least one edit and the respective character signatures of the one or more additional stored manual corrections, wherein the match is determined based on the character signature of the at least one edit and the respective character signatures of the one or more additional stored manual corrections having a number of pixels characterized by a common pixel characteristic, and wherein the number of pixels characterized by the common pixel characteristic is greater than a common pixel threshold; and grouping the one or more revised characters with the one or more additional stored manual corrections based at least in part on the determined match.

3. The method of claim 1, wherein using the one or more revised characters to generate the second plurality of automatically-made edits comprises:

determining that a Unicode of at least one edit of the second plurality of automatically-made edits matches the Unicode of the at least one edit of the first plurality of automatically-made edits;

automatically correcting the at least one edit of the second plurality of automatically-made edits to match the one or more revised characters; and at least one of:
determining that automatically correcting the at least one edit of the second plurality of automatically-made edits results in a correctly spelled word, or determining that the correction made to the at least one edit of the first plurality of automatically-made edits comprises an alternate suggested edit associated with the at least one edit of the first plurality of automatically-made edits, the alternate suggested edit having a respective confidence score above the confidence score threshold.

4. The method of claim 1, wherein the at least one edit comprises a first edit, and wherein the correction comprises a first correction, the method further comprising:

receiving, from the first user, indication of acceptance of a second edit of the first plurality of automatically-made edits, the second edit having a confidence score above the confidence score threshold; and assigning a first weight to corrections received from the first user, wherein the first weight is assigned based at least in part on the first correction and the acceptance of the second edit.

5. The method of claim 4, further comprising:
receiving, from a second user of the one or more computing devices, a second correction to a third edit of the first plurality of automatically-made edits, the third edit having a confidence score above the confidence score threshold;

receiving, from the second user, acceptance of a fourth edit of the first plurality of automatically-made edits, the fourth edit having a confidence score below the confidence score threshold; and assigning a second weight to corrections received from the second user, wherein the second weight is assigned based at least in part on the second correction and the acceptance of the fourth edit, and wherein the first weight is greater than the second weight.

6. One or more non-transitory computer-readable media storing computer-readable instructions that, when executed, instruct one or more processors to perform operations comprising:

generating a first character recognition-based work including a first plurality of automatically-made edits, each edit of the first plurality of automatically-made edits being characterized by a Unicode and a confidence score;

comparing the respective confidence scores of the first plurality of automatically-made edits to a confidence score threshold;

identifying at least one edit of the first plurality of automatically-made edits as having a respective confidence score below the confidence score threshold;

determining a character signature of the at least one edit;
receiving a manual correction made to the at least one edit;
storing the manual correction in association with the character signature and the Unicode of the at least one edit; and generating, using the manual correction, to generate a second plurality of automatically-made edits in a second character recognition-based work, the second character recognition-based work being different than the first character recognition-based work.

7. The one or more non-transitory computer-readable media of claim 6, wherein the first character recognition-based work and the second character recognition-based work comprise works generated by an optical character recognition engine.

8. The one or more non-transitory computer-readable media of claim 6, wherein at least one of the first character recognition-based work or the second character recognition-based work is generated based on a plurality of inputs, the plurality of inputs comprising at least one of digital content, printed content, or the manual correction.

9. The one or more non-transitory computer-readable media of claim 6, the performed operations including providing an indication of the at least one edit to a user providing the manual correction, the indication identifying the at least one edit as being of questionable accuracy.

10. The one or more non-transitory computer-readable media of claim 6, wherein determining the character signature includes extracting at least one of a shape identifier, a boundary identifier, and a location identifier indicative of a character of the at least one edit.

11. The one or more non-transitory computer-readable media of claim 10, the performed operations further comprising replacing the character of the at least one edit with an additional character, the additional character being different than the character of the at least one edit.

12. The one or more non-transitory computer-readable media of claim 6, the performed operations further comprising:

determining that at least one edit of the second plurality of automatically-made edits is characterized by a respective confidence score below the confidence score threshold;

determining that a Unicode of the at least one edit of the second plurality of automatically-made edits matches the stored Unicode of the at least one edit of the first plurality of automatically-made edits; and automatically correcting the at least one edit of the second plurality of automatically-made edits to match the stored manual correction.

13. The one or more non-transitory computer-readable media of claim 12, the performed operations further comprising at least one of:

determining that automatically correcting the at least one edit of the second plurality of automatically-made edits results in a correctly spelled word; or determining that the stored manual correction comprises an alternate suggested edit associated with the at least one edit of the first plurality of automatically-made edits, the alternate suggested edit having a respective confidence score above the confidence score threshold.

14. The one or more non-transitory computer-readable media of claim 12, the performed operations further comprising:
   determining a character signature of the at least one edit of the second plurality of automatically-made edits; and
   determining that the stored character signature of the at least one edit of the first plurality of automatically-made edits matches the character signature of the at least one edit of the second plurality of automatically-made edits.

15. The one or more non-transitory computer-readable media of claim 6, wherein each edit of the first plurality of automatically-made edits is made based at least in part on a stored set of data, the stored set of data including manual corrections previously made to character recognition-based works, different than the first work, by a plurality of users.

16. The one or more non-transitory computer-readable media of claim 6, wherein the at least one edit comprises a first edit and wherein the manual correction comprises a first manual correction, the performed operations further comprising:
   receiving the first manual correction from a first user;
   receiving, from the first user, indication of acceptance of a second edit of the first plurality of automatically-made edits, the second edit of the first plurality of automatically-made edits having a confidence score above the confidence score threshold; and
   assigning a first weight to manual corrections received from the first user.

17. The one or more non-transitory computer-readable media of claim 16, the performed operations further comprising:
   receiving, from a second user, a second manual correction to a third edit of the first plurality of automatically-made edits, the third edit having a confidence score above the confidence score threshold; and
   assigning, based at least in part on the second manual correction, a second weight to manual corrections received from the second user, the first weight being greater than the second weight.

18. One or more computing devices, comprising:
   one or more processors; and
   memory, wherein the memory includes executable instructions that, when executed by the processor, cause the processor to perform acts comprising:
      generating a first character recognition-based work, the first character recognition-based work including a first plurality of automatically-made edits made by the one or more computing devices;
      assigning a Unicode and a confidence score to each edit of the first plurality of automatically-made edits;
      comparing the respective confidence scores of the first plurality of automatically-made edits to a confidence score threshold;
      identifying at least one edit of the first plurality of automatically-made edits as having a respective confidence score below the confidence score threshold, and associating a character signature with the at least one edit;
      receiving a manual correction made to the at least one edit;
      storing the manual correction in the memory in association with the character signature and the Unicode of the at least one edit; and
      generating, based at least in part on the manual correction, a second plurality of automatically-made edits in a second character recognition-based work, and wherein the second character recognition-based work is different than the first character recognition-based work.

19. The one or more computing devices of claim 18, wherein storing the manual correction in the memory for storage includes:
   comparing, on a pixel-by-pixel basis, the character signature of the at least one edit with respective character signatures of one or more additional stored manual corrections;
   determining, based on the comparing, a match between the character signature of the at least one edit and the respective character signatures of the one or more additional stored manual corrections, wherein the match is determined based on the character signature of the at least one edit and the respective character signatures of the one or more additional stored manual corrections having a number of pixels characterized by a common pixel characteristic, and wherein the number of pixels characterized by the common pixel characteristic is greater than a common pixel threshold; and
   grouping, in the memory, the one or more revised characters with the one or more additional stored manual corrections based at least in part on the determined match.

20. The one or more computing devices of claim 18, wherein the memory further comprises:
   a first data store configured to store the manual correction in association with the character signature and the Unicode,
   a second data store configured to store at least one of the first character recognition-based work or the second character recognition-based work, and
   a third data store configured to store a plurality of inputs, the plurality of inputs being used to generate the at least one of the first character recognition-based work or the second character recognition-based work.

* * * * *